(12) United States Patent
Lee et al.

(10) Patent No.: US 11,831,437 B2
(45) Date of Patent: Nov. 28, 2023

(54) METHOD FOR DECODING CODEWORD IN WIRELESS COMMUNICATION SYSTEM AND TERMINAL THEREFOR

(71) Applicant: LG ELECTRONICS INC., Seoul (KR)

(72) Inventors: Sangrim Lee, Seoul (KR); Byounghoon Kim, Seoul (KR); Kijun Jeon, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/619,408

(22) PCT Filed: Jul. 3, 2019

(86) PCT No.: PCT/KR2019/008149
§ 371 (c)(1),
(2) Date: Dec. 15, 2021

(87) PCT Pub. No.: WO2021/002508
PCT Pub. Date: Jan. 7, 2021

(65) Prior Publication Data
US 2022/0385406 A1    Dec. 1, 2022

(51) Int. Cl.
*H04L 1/18*    (2023.01)
(52) U.S. Cl.
CPC ..................... *H04L 1/18* (2013.01)

(58) Field of Classification Search
CPC ....... H04B 1/7107; H04L 1/00; H04L 1/0056; H04L 1/18; H04L 1/1835; H04L 25/03
See application file for complete search history.

(56) References Cited

U.S. PATENT DOCUMENTS

| 10,771,122 | B1* | 9/2020 | Pasad ................ H04L 25/03019 |
| 2009/0046786 | A1 | 2/2009 | Moulsley et al. |
| 2012/0069757 | A1 | 3/2012 | Jiang et al. |
| 2022/0069941 | A1* | 3/2022 | Levitsky ............... H04L 1/1835 |

FOREIGN PATENT DOCUMENTS

| EP | 3016307 A1 | 5/2016 |
| KR | 1020080110536 A | 12/2008 |
| KR | 1020120062834 A | 6/2012 |

* cited by examiner

*Primary Examiner* — Mansour Oveissi
(74) *Attorney, Agent, or Firm* — BRYAN CAVE LEIGHTON PAISNER LLP

(57) ABSTRACT

Disclosed is a method by which a terminal decodes a codeword in a wireless communication system. Specifically, the method may comprise: receiving a plurality of codewords; and decoding the plurality codewords on the basis of successive interference cancellation (SIC). In particular, the SIC may be performed on the basis of a decoding policy for decoding the plurality of codewords. In particular, the decoding policy may be determined by a neural network trained on the basis of a state and a reward related to the plurality of codewords.

12 Claims, 13 Drawing Sheets

(a)

(b)

(a) CW interference relationship 1          (b) CW interference relationship 2

METHOD FOR DECODING CODEWORD IN WIRELESS COMMUNICATION SYSTEM AND TERMINAL THEREFOR

This application is the National Stage filing under 35 U.S.C. 371 of International Application No. PCT/KR2019/008149 filed on Jul. 3, 2019, the contents of which are hereby incorporated by reference herein in its entirety.

TECHNICAL FIELD

The present disclosure relates to a method of decoding a codeword in a wireless communication system and a user equipment (UE) therefor and, more particularly, to a method of decoding a plurality of codewords based on successive interference cancellation (SIC) and a UE therefor.

BACKGROUND ART

Hybrid automatic repeat and request (HARQ) is one method for increasing data reliability through retransmission. As methods for improving the performance of HARQ, allocating many memories to a buffer and applying brute-force decoding may be considered. However, these methods cause problems such as a memory issue, an increase in decoding complexity, and a decoding process delay. Accordingly, a data reception method capable of improving HARQ performance and simultaneously solving the above-mentioned problems is needed.

As an example, a HARQ reception method based on codeword (CW) successive interference cancellation (SIC) may be used. Here, a CW means a bit stream to which channel encoding has been applied after cyclic redundancy check (CRC) attachment to a transport block (TB) from a medium access control (MAC) layer and segmentation. The TB may be information bits.

It is assumed that a receiving UE uses a CW SIC reception method in a 4×4 multiple input and multiple output (MIMO) environment, and a transmitting UE transmits two CWs. Since the transmitting UE and the receiving UE are equally aware of CW-to-layer mapping, which is a CW-to-MIMO layer mapping relationship, the CW-level SIC reception method may be described as follows.

First, the receiving UE performs equalization including a minimum mean squared error (MMSE) and zero forcing (ZF) based on channel estimation information in order to detect one of the two received CWs. The receiving UE calculates a log likelihood ratio (LLR) value of the CW based on the equalized received signals. Next, a channel decoder of the receiving UE performs decoding based on the LLR value. The receiving UE may finally determine whether decoding is successful through a CRC.

If decoding is successful, the receiving UE re-encodes the first CW using modulation and information bits obtained based on the estimated channel and removes a received signal corresponding to the first CW from the received signals. Thereafter, the receiving UE decodes the second CW in a state in which there is no interference of the received signal corresponding to the first CW.

Upon failing to decode the first CW, the receiving UE stores an LLR value obtained in the decoding process of the first CW in a HARQ buffer. The receiving UE attempts to decode the second CW in a state in which the received signal corresponding to the first CW exists. If decoding of the second CW also fails, the receiving UE stores an acquired LLR value in the HARQ buffer and makes a request for retransmission to the transmitting UE. Thereafter, the receiving UE performs decoding again through incremental redundancy (IR) or chase combining (CC) using the retransmitted signal and information stored in the HARQ buffer.

As described above, the LLR values stored in the HARQ buffer may be values including interference. Therefore, it is most advantageous in terms of performance to attempt to perform decoding for all cases. However, such a brute-force method has problems in that a large number of buffers for processing a high processing delay and storage are demanded.

DETAILED DESCRIPTION OF THE DISCLOSURE

Technical Problems

An object of the present disclosure is to provide a method of decoding a plurality of codewords based on sequential interference cancellation (SIC).

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solutions

To achieve the above object, a method of decoding a codeword in a wireless communication system by a user equipment includes receiving a plurality of codewords, and decoding the codewords based on successive interference cancellation (SIC). The SIC may be performed based on a decoding policy for decoding the codewords, and the decoding policy may be determined by a neural network trained based on a state and a reward related to the codewords.

The state may include channel quality of each of a first codeword and a second codeword, and the reward may include decoding success or failure of each of the first codeword and the second codeword.

The decoding policy may include i) an order of decoding the codewords and ii) combination or non-combination of each codeword with a log likelihood ratio (LLR) value calculated in previous transmission of each codeword, stored in a hybrid automatic repeat and request (HARQ) buffer, and the neural network may be trained based on decoding results of the codewords based on the decoding policy.

The state may further include an interference relationship in a time domain and a frequency domain of the codewords, and the neural network may be trained based further on the interference relationship.

Upon failing to decode the codewords based on the decoding policy, the method may further include managing a hybrid automatic repeat and request (HARQ) buffer using log likelihood ratio (LLR) values calculated for the respective codewords.

The managing the HARQ buffer may include i) adding the LLR values calculated for the respective codewords to previous LLR values stored in the HARQ buffer, (ii) replacing the previous LLR values stored in the HARQ buffer with the LLR values calculated for the respective codewords, or (iii) dropping the LLR values calculated for the respective codewords.

The managing the HARQ buffer may include adding only LLR values having a threshold value or more among the LLR values calculated for the respective codewords to the previous LLR values stored in the HARQ buffer.

Advantageous Effects

According to an example or implementation of the present disclosure, since a decoding policy of sequential interference cancellation (SIC) is efficiently determined using a neural network to which reinforcement learning is applied, i) allocation of a large number of memories for a buffer may be prevented, and ii) a processing time may be improved by reducing the complexity of a receiving UE.

It will be appreciated by persons skilled in the art that the effects that could be achieved with the present disclosure are not limited to what has been particularly described hereinabove and other advantages of the present disclosure will be more clearly understood from the following detailed description.

DESCRIPTION OF DRAWINGS

The accompanying drawings, which are included to provide a further understanding of the present disclosure and are incorporated in and constitute a part of this application, illustrate embodiments of the present disclosure and together with the description serve to explain the principle of the present disclosure. In the drawings.

BEST MODE FOR CARRYING OUT THE DISCLOSURE

Figure 1:
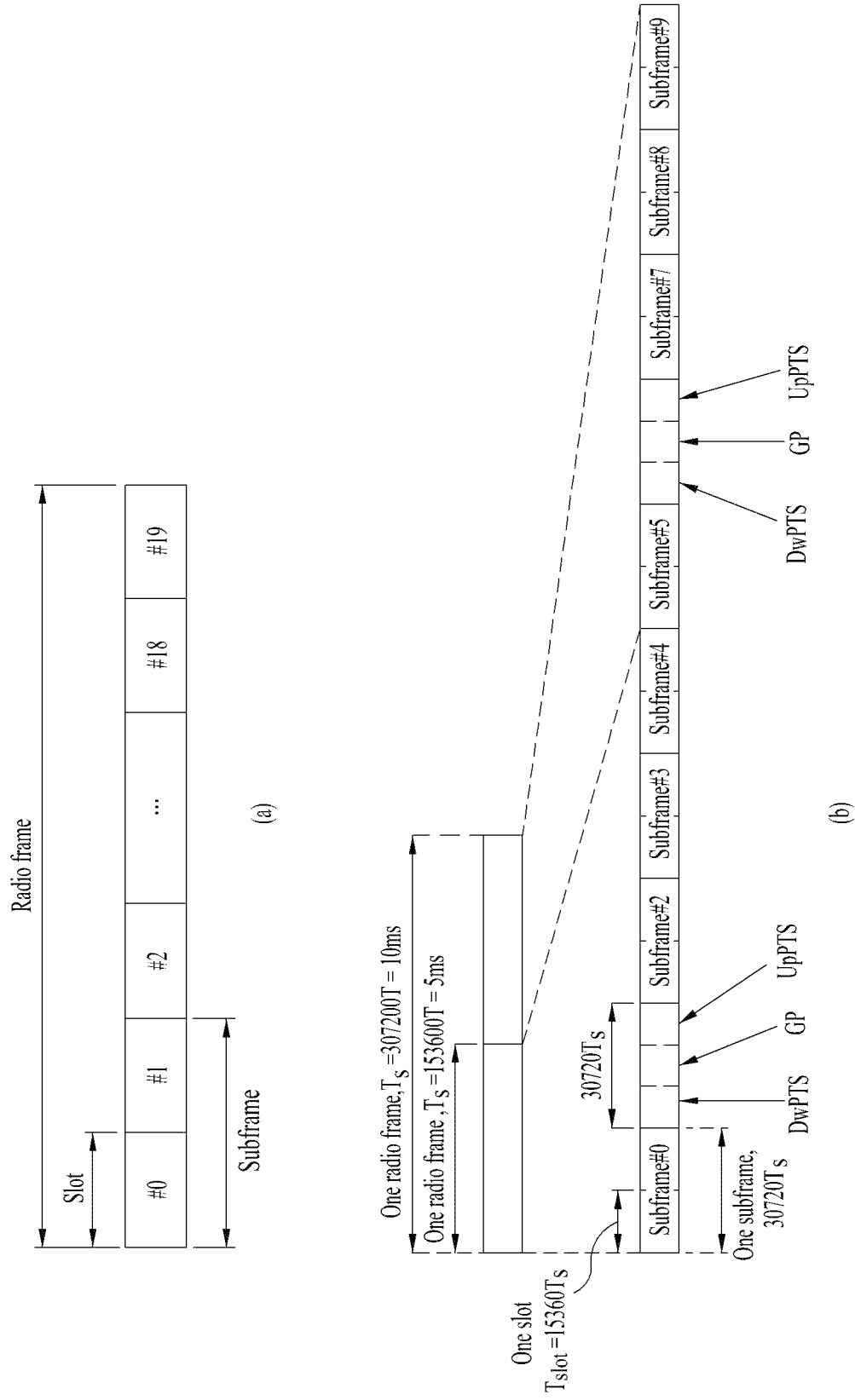
FIG. 1 is a diagram illustrating the structure of a radio frame.

The embodiments of the present disclosure described hereinbelow are combinations of elements and features of the present disclosure. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or features of any one embodiment may be included in another embodiment and may be replaced with corresponding constructions or features of another embodiment.

In the embodiments of the present disclosure, a description is made, centering on a data transmission and reception relationship between a base station (BS) and a user equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'relay node (RN)' or 'relay station (RS)'. The term 'terminal' may be replaced with the term 'UE', 'mobile station (MS)', 'mobile subscriber station (MSS)', 'subscriber station (SS)', etc. The term "cell", as used herein, may be applied to transmission and reception points such as a base station (eNB), a sector, a remote radio head (RRH), and a relay, and may also be extensively used by a specific transmission/reception point to distinguish between component carriers.

Specific terms used for the embodiments of the present disclosure are provided to help the understanding of the present disclosure. These specific terms may be replaced with other terms within the scope and spirit of the present disclosure.

In some cases, to prevent the concept of the present disclosure from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present disclosure may be supported by standard documents disclosed for at least one of wireless access systems, Institute of Electrical and Electronics Engineers (IEEE) 802, 3rd Generation Partnership Project (3GPP), 3GPP long term evolution (3GPP LTE), LTE-advanced (LTE-A), and 3GPP2. Steps or parts that are not described to clarify the technical features of the present disclosure may be supported by those documents. Further, all terms as set forth herein may be explained by the standard documents.

Techniques described herein may be used in various wireless access systems such as code division multiple access (CDMA), frequency division multiple access (FDMA), time division multiple access (TDMA), orthogonal frequency division multiple access (OFDMA), single carrier-frequency division multiple access (SC-FDMA), etc. CDMA may be implemented as a radio technology such as universal terrestrial radio access (UTRA) or CDMA2000. TDMA may be implemented as a radio technology such as global system for mobile communications (GSM)/general packet radio service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, evolved-UTRA (E-UTRA) etc. UTRA is a part of universal mobile telecommunications system (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX may be described by the IEEE 802.16e standard (wireless metropolitan area network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present disclosure are not limited thereto.

LTE/LTE-A Resource Structure/Channel

With reference to FIG. 1, the structure of a radio frame will be described below.

In a cellular orthogonal frequency division multiplexing (OFDM) wireless packet communication system, uplink and/or downlink data packets are transmitted in subframes. One subframe is defined as a predetermined time period including a plurality of OFDM symbols. The 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a transmission time interval (TTI). For example, one subframe may be 1 ms in duration and one slot may be 0.5 ms in duration. A slot includes a plurality of OFDM symbols in the time domain and a plurality of resource blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a cyclic prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease inter-symbol interference (ISI).

In the case of the normal CP, one subframe includes 14 OFDM symbols because one slot includes 7 OFDM symbols. The first two or three OFDM symbols of each subframe may be allocated to a physical downlink control channel (PDCCH) and the other OFDM symbols may be allocated to a physical downlink shared channel (PDSCH).

FIG. 1(b) illustrates the type-2 radio frame structure. A type-2 radio frame includes two half frames, each having 5 subframes, a downlink pilot time slot (DwPTS), a guard period (GP), and an uplink pilot time slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
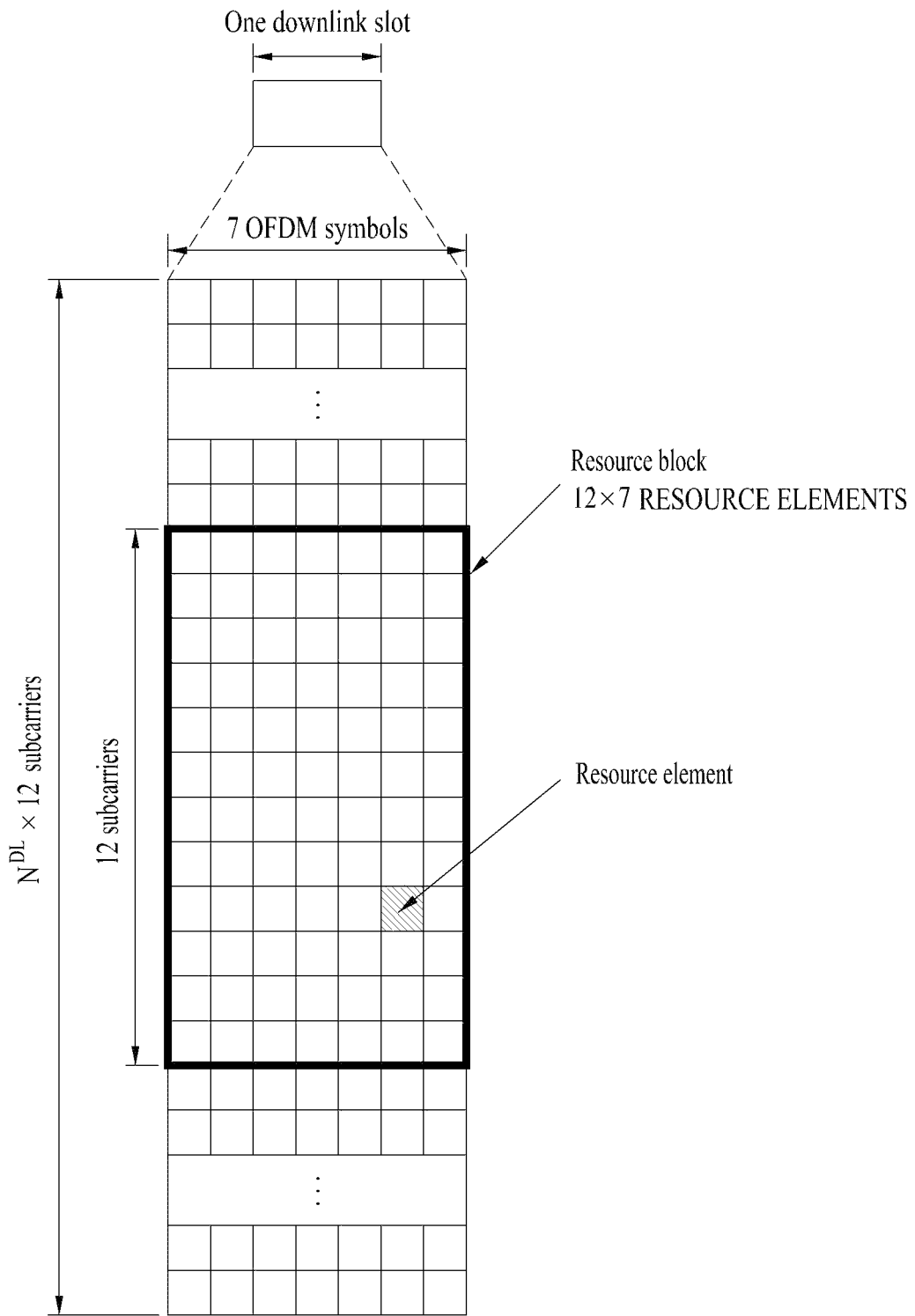
FIG. 2 is a diagram illustrating a resource grid during the duration of one downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present disclosure. For example, a downlink slot may include 7 OFDM symbols in the case of the normal CP, whereas a downlink slot may include 6 OFDM symbols in the case of the extended CP. Each element of the resource grid is referred to as a resource element (RE). An RB includes 12×7 REs. The number of RBs in a downlink slot, NDL depends on a downlink transmission bandwidth. An uplink slot may have the same structure as a downlink slot.

Figure 3:
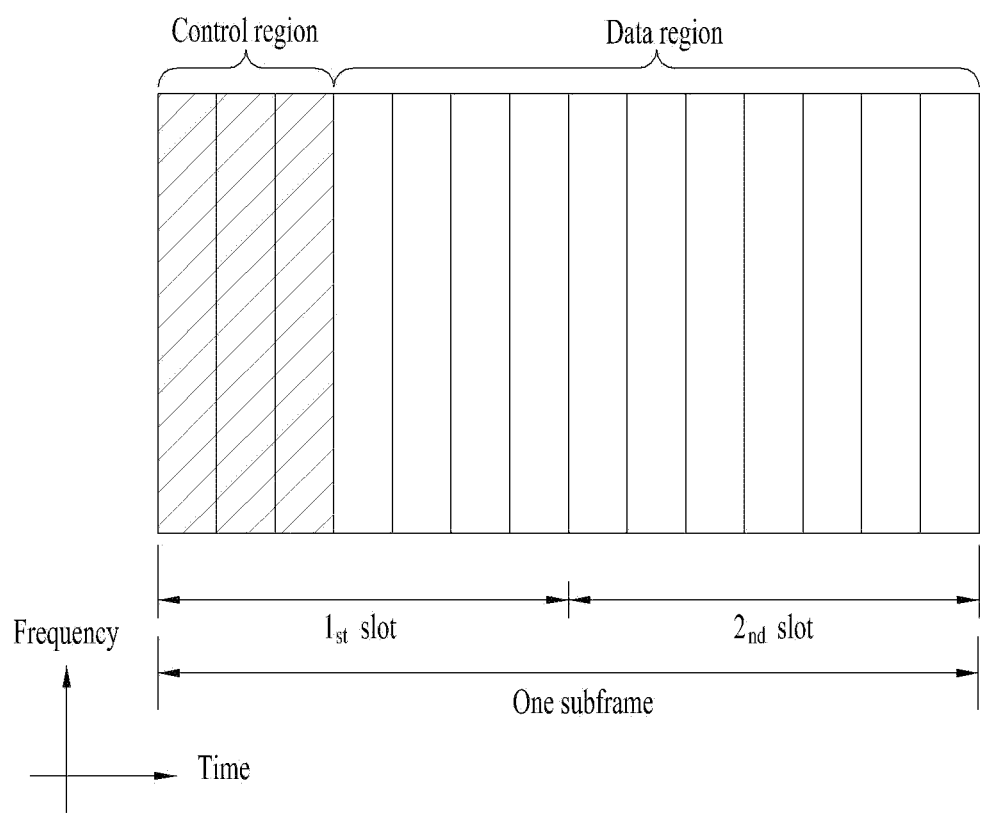
FIG. 3 is a diagram illustrating the structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a physical control format indicator channel (PCFICH), a physical downlink control channel (PDCCH), and a physical hybrid automatic repeat request (HARQ) indicator channel (PHICH). The PCFICH is located in the first OFDM symbol of a subframe, carrying information about the number of OFDM symbols used for transmission of control channels in the subframe. The PHICH delivers an HARQ acknowledgment/negative acknowledgment (ACK/NACK) signal in response to an uplink transmission. Control information carried on the PDCCH is called downlink control information (DCI). The DCI transports uplink or downlink scheduling information, or uplink transmission power control commands for UE groups. The PDCCH delivers information about resource allocation and a transport format for a downlink shared channel (DL-SCH), resource allocation information about an uplink shared channel (UL-SCH), paging information of a paging channel (PCH), system information on the DL-SCH, information about resource allocation for a higher-layer control message such as a Random Access Response transmitted on the PDSCH, a set of transmission power control commands for individual UEs of a UE group, transmission power control information, voice over Internet protocol (VoIP) activation information, etc. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE includes a plurality of RE groups. The format of a PDCCH and the number of available bits for the PDCCH are determined according to the correlation between the number of CCEs and a coding rate provided by the CCEs. An eNB determines the PDCCH format according to DCI transmitted to a UE and adds a cyclic redundancy check (CRC) to control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator Identifier (P-RNTI). If the PDCCH carries system information, particularly, a system information block (SIB), its CRC may be masked by a system information ID and a system information RNTI (SI-RNTI). To indicate that the PDCCH carries a random access response in response to a random access preamble transmitted by a UE, its CRC may be masked by a random access-RNTI (RA-RNTI).

Figure 4:
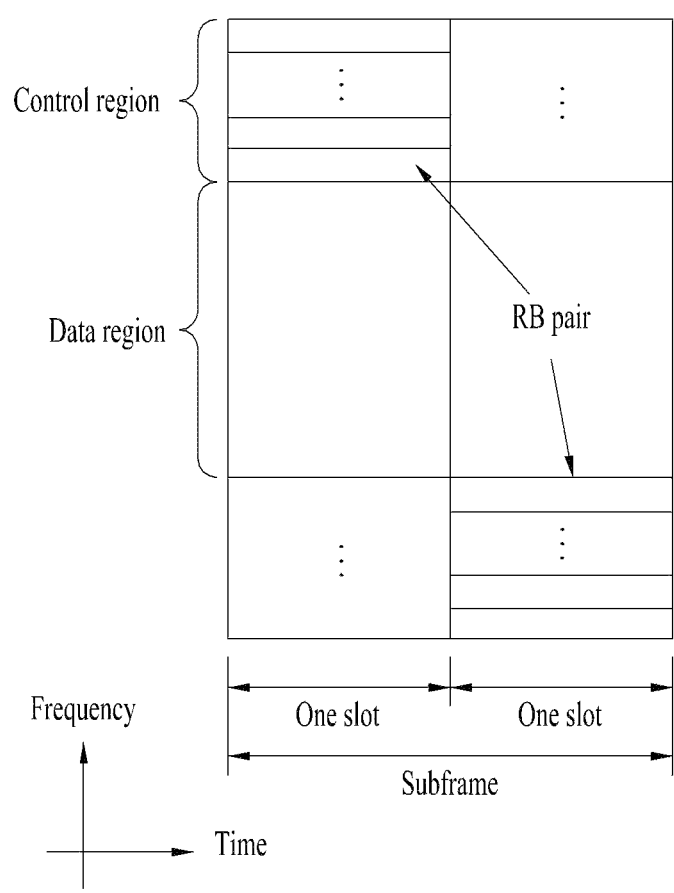
FIG. 4 is a diagram illustrating the structure of an uplink subframe.

FIG. 4 illustrates the structure of an uplink subframe. An uplink subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signal (RS)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between transmission (Tx) antennas and reception (Rx) antennas is required for successful signal reception. Accordingly, an RS should be transmitted through each Tx antenna.

RSs may be divided into downlink RSs and uplink RSs. In the current LTE system, the uplink RSs include:
  i) Demodulation-reference signal (DM-RS) used for channel estimation for coherent demodulation of information delivered on a PUSCH and a PUCCH; and
  ii) Sounding reference signal (SRS) used for an eNB or a network to measure the quality of an uplink channel in a different frequency.

The downlink RSs are categorized into:
  i) Cell-specific reference signal (CRS) shared among all UEs of a cell;
  ii) UE-specific RS dedicated to a specific UE;
  iii) DM-RS used for coherent demodulation of a PDSCH, when the PDSCH is transmitted;
  iv) Channel state information-reference signal (CSI-RS) carrying CSI when downlink DM-RSs are transmitted;
  v) Multimedia broadcast single frequency network (MBSFN) RS used for coherent demodulation of a signal transmitted in MBSFN mode; and
  vi) Positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE may demodulate the data by measuring a channel using the RS. This RS should be transmitted in a data transmission area.

Modeling of Multiple-Input Multiple-Output (MIMO) System

Figure 5:
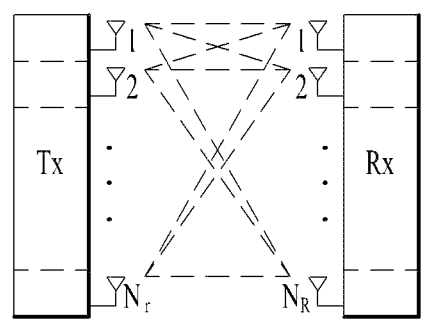
FIG. 5 is a diagram illustrating the configuration of a wireless communication system having multiple antennas.
Figure 5:
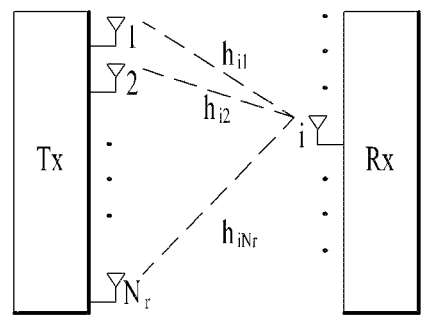

FIG. 5 is a diagram illustrating a configuration of a wireless communication system having multiple antennas.

As shown in FIG. 5(a), if the number of Tx antennas is increased to NT and the number of Rx antennas is increased to $N_R$, a theoretical channel transmission capacity is increased in proportion to the number of antennas, unlike the case where a plurality of antennas is used in only a transmitter or a receiver. Accordingly, it is possible to improve a transfer rate and to remarkably improve frequency efficiency. As the channel transmission capacity is increased, the transfer rate may be theoretically increased by a product of a maximum transfer rate Ro upon utilization of a single antenna and a rate increase ratio Ri.

$$R_i = \min(N_T, N_R) \quad \text{[Equation 1]}$$

For instance, in an MIMO communication system, which uses four Tx antennas and four Rx antennas, a transmission rate four times higher than that of a single antenna system may be obtained.

In order to explain a communicating method in a MIMO system in detail, mathematical modeling may be represented as follows. It is assumed that there are NT Tx antennas and N R Rx antennas.

Regarding a transmitted signal, if there are $N_T$ Tx antennas, the maximum number of pieces of information that may be transmitted is NT. Hence, the transmission information may be represented as shown in Equation 2.

$$s = [s_1, s_2, \ldots, s_{N_T}]^T \quad \text{[Equation 2]}$$

Meanwhile, transmit powers may be set different from each other for individual pieces of transmission information $s_1, s_2, \ldots, s_{N_T}$, respectively. If the transmit powers are set to $P_1, P_2, \ldots, P_{N_T}$, respectively, the transmission information with adjusted transmit powers may be represented as Equation 3.

$$\hat{s} = [\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

In addition, $\hat{S}$ may be represented as Equation 4 using diagonal matrix P of the transmission power.

$$\hat{s} = \begin{bmatrix} P_1 & & 0 \\ & P_2 & \\ & & \ddots \\ 0 & & P_{N_T} \end{bmatrix} \begin{bmatrix} s_1 \\ s_2 \\ \vdots \\ s_{N_T} \end{bmatrix} = Ps \quad \text{[Equation 4]}$$

Assuming a case of configuring $N_T$ transmitted signals $x_1, x_2, \ldots, x_{N_T}$, which are actually transmitted, by applying weight matrix W to the information vector $\hat{S}$ having the adjusted transmit powers, the weight matrix W serves to appropriately distribute the transmission information to each antenna according to a transport channel state. $x_1, x_2, \ldots, x_{N_T}$ may be expressed by using the vector X as follows.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs \quad \text{[Equation 5]}$$

In Equation 5, $W_{ij}$ denotes a weight between an $i^{th}$ Tx antenna and $j^{th}$ information. W is also called a precoding matrix.

If the $N_R$ Rx antennas are present, respective received signals $y_1, y_2, \ldots, y_{N_R}$ of the antennas may be expressed as follows.

$$y=[y_1,y_2,\ldots,y_{N_R}]^T \quad \text{[Equation 6]}$$

If channels are modeled in the MIMO wireless communication system, the channels may be distinguished according to Tx/Rx antenna indexes. A channel from the Tx antenna j to the Rx antenna i is denoted by $h_{ij}$. In $h_{ij}$, it is noted that the indexes of the Rx antennas precede the indexes of the Tx antennas in view of the order of indexes.

FIG. 5(b) is a diagram illustrating channels from the $N_T$ Tx antennas to the Rx antenna i. The channels may be combined and expressed in the form of a vector and a matrix. In FIG. 5(b), the channels from the $N_T$ Tx antennas to the Rx antenna i may be expressed as follows.

$$h_i^T = [h_{i1}, h_{i2}, \ldots, h_{iN_T}] \quad \text{[Equation 7]}$$

Accordingly, all channels from the $N_T$ Tx antennas to the $N_R$ Rx antennas may be expressed as follows.

$$H = \begin{bmatrix} h_1^T \\ h_2^T \\ \vdots \\ h_i^T \\ \vdots \\ h_{N_R}^T \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \quad \text{[Equation 8]}$$

An AWGN (Additive White Gaussian Noise) is added to the actual channels after a channel matrix H. The AWGN $n_1, n_2, \ldots, n_{N_R}$ respectively added to the $N_R$ Rx antennas may be expressed as follows.

$$n=[n_1,n_2,\ldots,n_{N_R}]^T \quad \text{[Equation 9]}$$

Through the above-described mathematical modeling, the received signals may be expressed as follows.

$$y = \begin{bmatrix} y_1 \\ y_2 \\ \vdots \\ y_i \\ \vdots \\ y_{N_R} \end{bmatrix} = \begin{bmatrix} h_{11} & h_{12} & \ldots & h_{1N_T} \\ h_{21} & h_{22} & \ldots & h_{2N_T} \\ \vdots & & \ddots & \\ h_{i1} & h_{i2} & \ldots & h_{iN_T} \\ \vdots & & \ddots & \\ h_{N_R 1} & h_{N_R 2} & \ldots & h_{N_R N_T} \end{bmatrix} \begin{bmatrix} x_1 \\ x_2 \\ \vdots \\ x_j \\ \vdots \\ x_{N_T} \end{bmatrix} + \begin{bmatrix} n_1 \\ n_2 \\ \vdots \\ n_i \\ \vdots \\ n_{N_R} \end{bmatrix} = Hx + n \quad \text{[Equation 10]}$$

Meanwhile, the number of rows and columns of the channel matrix H indicating the channel state is determined by the number of Tx and Rx antennas. The number of rows of the channel matrix H is equal to the number $N_R$ of Rx antennas and the number of columns thereof is equal to the number $N_T$ of Tx antennas. That is, the channel matrix H is an $N_R \times N_T$ matrix.

The rank of the matrix is defined by the smaller of the number of rows and the number of columns, which are independent from each other. Accordingly, the rank of the matrix is not greater than the number of rows or columns. The rank rank(H) of the channel matrix H is restricted as follows.

$$\text{rank}(H) \leq \min(N_T, N_R) \quad \text{[Equation 11]}$$

Additionally, the rank of a matrix may also be defined as the number of non-zero Eigen values when the matrix is Eigen-value-decomposed. Similarly, the rank of a matrix may be defined as the number of non-zero singular values when the matrix is singular-value-decomposed. Accordingly, the physical meaning of the rank of a channel matrix may be the maximum number of channels through which different pieces of information may be transmitted.

Proposal of Efficient Decoding Method Using Reinforcement Learning

In a MIMO HARQ scenario, a transceiver of a UE receives signals including a plurality of CWs through multiple antennas. In this case, the UE may use an SIC reception method to secure performance. The UE using the SIC reception method i) sequentially decodes the CWs, ii) re-encodes a successfully decoded CW, and iii) removes the re-encoded CW from received signals, thereby raising decoding performance of the next CW. However, upon failing to decode a CW due to a channel environment etc., the UE stores an LLR value corresponding to each CW in a HARQ buffer and requests retransmission. Then, the UE attempts to decode a CW using a combination of a newly received signal and an LLR value pre-stored in the HARQ buffer.

If a large number of CWs is transmitted through multiple antennas or if multiple retransmissions occur, a large number of HARQ buffers may be required. In addition, in order to design a decoder with high performance, since a combination of a plurality of CW decoding orders should be considered, complexity may increase. Accordingly, a method of efficiently decoding a plurality of CWs is needed.

To achieve the above technical object, the present disclosure proposes a HARQ reception method of a feed-forward scheme based on a decoding policy determined by a receiver through reinforcement learning.

Figure 6:
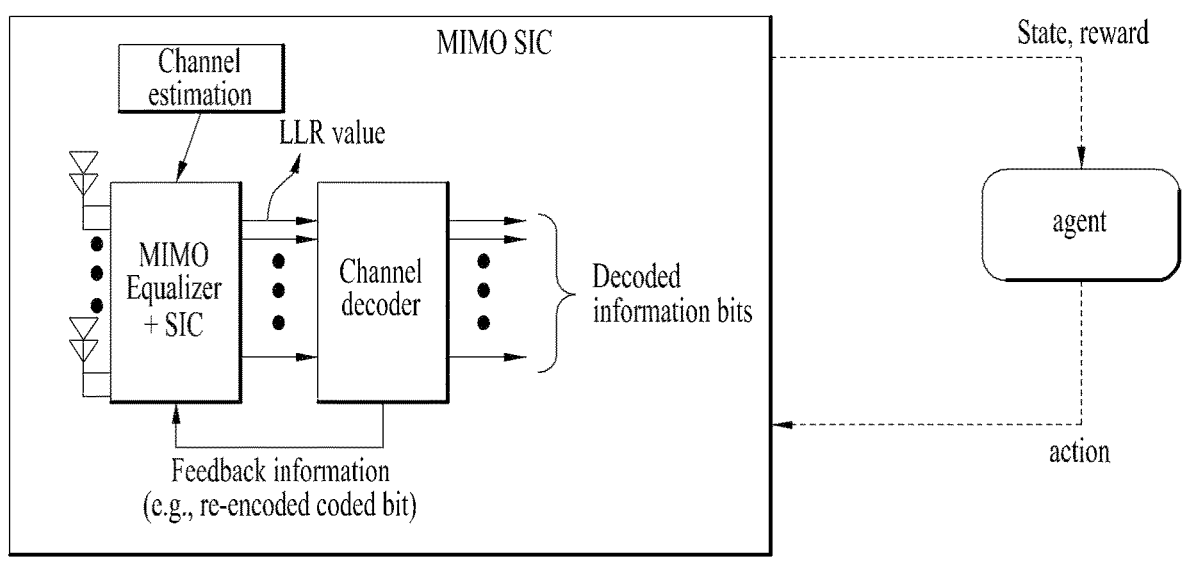
FIG. 6 is a diagram illustrating the configuration of a UE for decoding codewords according to an example or implementation of the present disclosure.

FIG. 6 is a diagram illustrating a MIMO SIC receiver and an agent according to an example or implementation of the present disclosure. A HARQ reception method performed by the proposed MIMO SIC receiver and agent may include learning, by the agent, actions according to a state and a reward from training data and determining an action in a HARQ process through the agent which has previously learned the actions. Meanwhile, the action may refer to a decoding policy of the receiver. Operations of the agent described below may be performed by a processor 21 of the UE 20 illustrated in FIG. 13.

Referring to FIG. 6, a receiving UE proposed according to an example or implementation of the present disclosure may include the MIMO SIC receiver and the agent.

Upon failing to decode a CW, the MIMO SIC receiver transmits information about the state and the reward to the agent, and the agent determines the action based on the information. The above-mentioned state, reward, and action may be information described below.

The state may include at least one of channel quality information of each CW, an average signal-to-noise ratio (SNR) of each CW, the number of retransmissions of each CW, a code rate of each CW, a modulation and coding scheme (MCS) index of each CW, layer mapping information of each CW, a received average SNR of each CW, a received average SNR of each layer, information about an interference relationship between CWs, or the total number of CWs.

The reward may include at least one of decoding success or failure (ACK or NACK) for each CW, throughput of data upon which decoding is successful, or $$\frac{\text{throughput of data upon which decoding is successful}}{\text{number of retransmissions}}.$$

The action may include at least one of decoding order of CWs, combination or non-combination of a CW with a HARQ buffer during decoding of each CW, demodulation order of layers, a HARQ buffer update policy (add/replace/drop), or a size threshold value of an LLR of each CW.

The proposed HARQ reception method may include performing reinforcement learning to determine an action according to a state and a reward through training data, and transmitting a decoding policy according to the state based on learned information.

For convenience of description below, notations are defined as follows. First, $CW_n$ denotes $CW_n$ at a current reception timing, $CW_n^{-1}$ denotes an LLR value calculated from transmissions prior to $CW_n$ stored in the HARQ buffer, and $CW_n + CW_n^{-1}$ denotes the sum of the currently received $CW_n$ and LLR information pre-stored in the HARQ buffer. Meanwhile, the following description is given based on Q-learning among reinforcement learning methods. However, it is obvious that the following description may be applied to various reinforcement learning methods such as deep Q-network and multi-armed bandit methods other than Q-learning.

Implementation 1) In Case of CW-Level SIC

Assume that the receiving UE uses a CW SIC reception method in a 4×4 MIMO environment, and the transmitting UE transmits two CWs. First, steps of training an agent through training data will be described. For reinforcement learning of the agent, a state, a reward, and an action need to be defined first. According to an example or implementation of the present disclosure, the state and the reward may be defined as shown in [Table 1].

$$Q(s_t, a_t) \leftarrow (1-\alpha) \cdot \underbrace{Q(s_t, a_t)}_{\text{old value}} + \underbrace{\alpha}_{\text{learning rate}} \cdot \left( \underbrace{r_t}_{\text{reward}} + \underbrace{\gamma}_{\text{discount factor}} \cdot \underbrace{\max_a Q(s_{t+1}, a)}_{\text{estimate of optimal future value}} \right)$$ [Equation 12]

Figure 7:
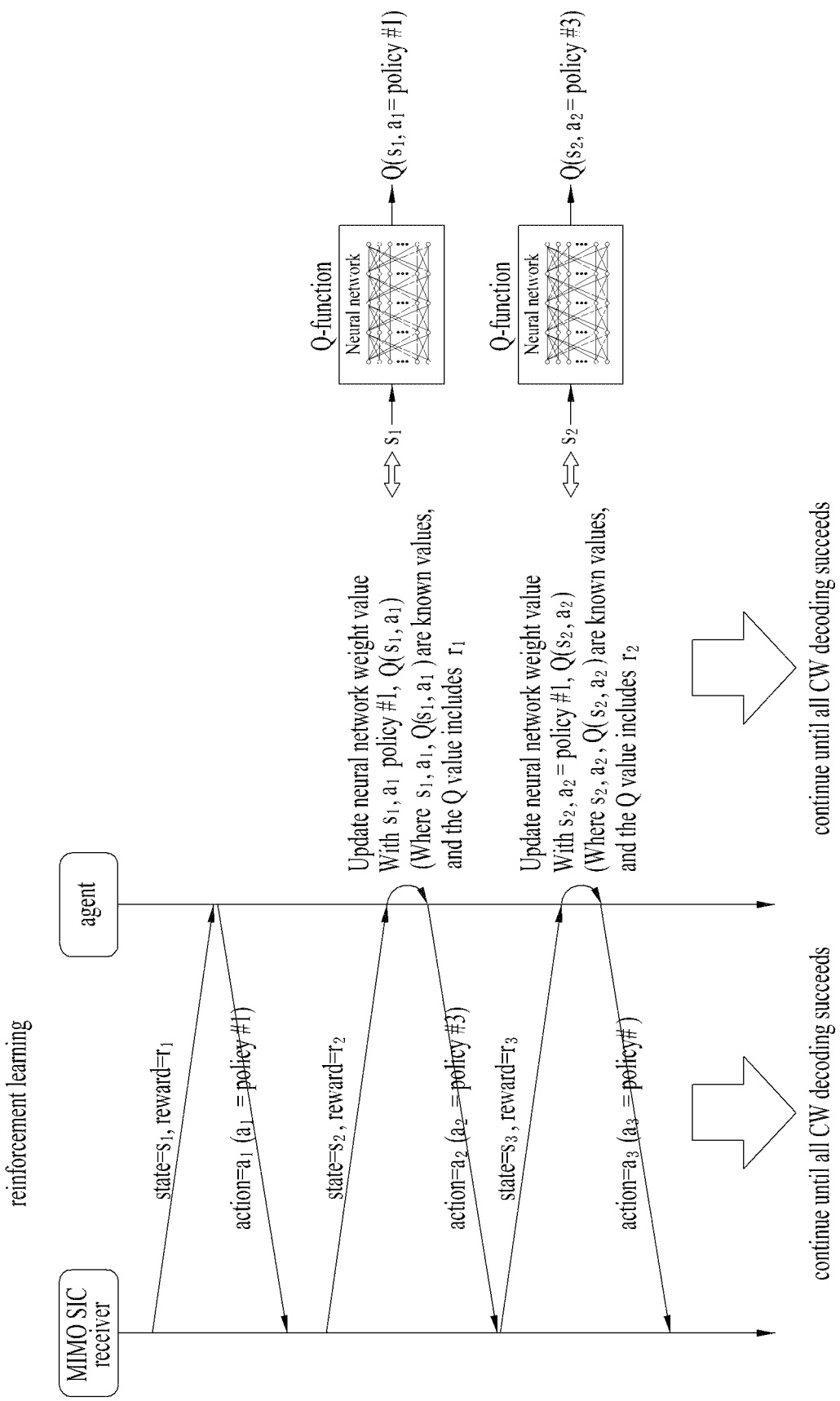
FIGS. 7 and 8 are diagrams illustrating a codeword decoding method applied to codeword-level SIC according to an example or implementation of the present disclosure.

The agent may transmit a decoding policy that maximizes the Q value based on the learned Q-table and the state to the MIMO SIC receiver. FIG. 7 is a flowchart of learning steps. Referring to FIG. 7, the agent transmits an action based on a state received from the MIMO SIC receiver (i.e., environment) and receives a reward, thereby updating a Q-function that causes a neural network to learn the Q-function well. Learning is performed by repeating these processes.

Figure 8:
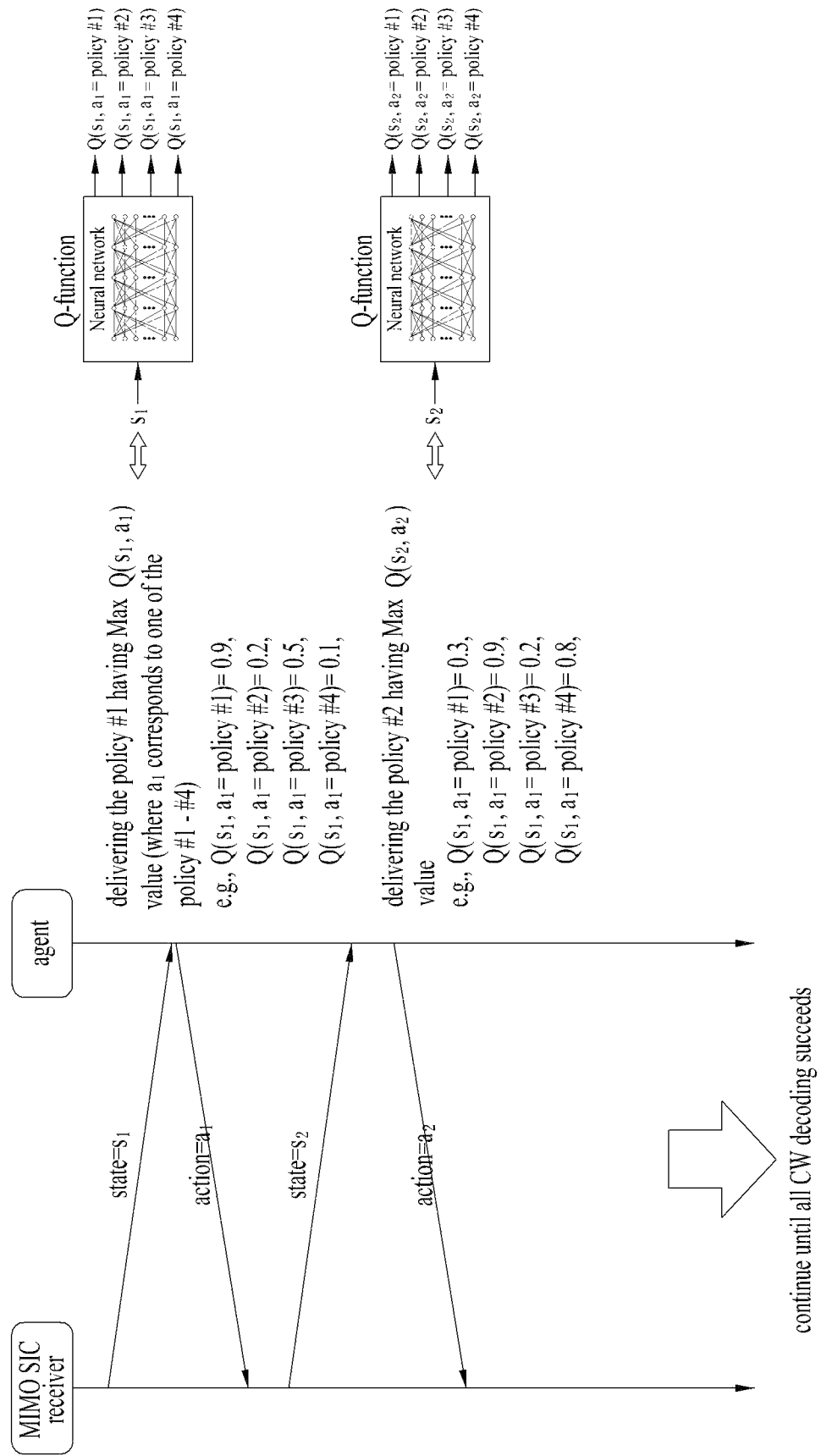

FIG. 8 is a flowchart illustrating a method of determining an action based on a pre-learned Q-function. Referring to FIG. 8, upon receiving a current state, the agent transmits a decoding policy having the highest Q value among four actions, i.e., decoding policies, to the MIMO SIC receiver through the pre-learned Q-function (i.e., a neural network). The MIMO SIC receiver performs decoding based on the received decoding policy.

According to an example or implementation of the present disclosure, even in the step of determining the action based

TABLE 1

| | |
|---|---|
| State | Channel quality (e.g., CQI) of CW1, average SNR of CW1, code rate of CW1, number of retransmissions of CW1, channel quality (e.g., CQI) of CW2, average SNR of CW2, code rate of CW2, and/or number of retransmissions of CW2 |
| Reward | 0 for NACK and 1 for ACK, or 0 for NACK and 1/number of retransmissions for ACK |

The action or the decoding policy may be defined as follows.

1-1) When a CW of a current reception timing and an LLR value of a HARQ buffer are considered individually or in combination, the agent may determine the decoding policy as follows. In this case, the number of HARQ buffers in which an LLR value for each CW is stored may be one.

Policy #1: $CW_1 \to CW_2$
Policy #2: $CW_2 \to CW_1$
Policy #3: $CW_1 + CW_1^{-1} \to CW_2 + CW_2^{-1}$
Policy #4: $CW_2 + CW_2^{-1} \to CW_1 + CW_1^{-1}$ 1-2) When the CW of the current reception timing and the LLR value of the HARQ buffer are always added, the agent may determine the decoding policy as follows.

Policy #1: $CW_1 + CW_1^{-1} \to CW_2 + CW_2^{-1}$
Policy #2: $CW_2 + CW_2^{-1} \to CW_1 + CW_1^{-1}$ The receiving UE performs reinforcement learning using training data based on the defined state, reward, and action. For example, when the transmitting UE transmits two CWs, the MIMO SIC receiver of the receiving UE transmits a channel quality indicator (CQI) of each CW through channel measurement, an average SNR, a code rate of each CW, the number of retransmissions of each CW, and the reward to the agent, in order to learn the decoding policy of 1-1). The agent transmits a decoding policy with the highest Q value among decoding policies #1 to #4 to the MIMO SIC receiver based on a Q-table thereof. The MIMO SIC receiver performs decoding based on the received decoding policy and transmits reward '1' for success or reward '0' for failure back to the agent together with the state. The agent learns the Q-table through the above process. The Q value may be defined as follows.

on the pre-learned Q-function, the agent may continuously perform Q-function updating by receiving a reward. While the flowcharts illustrated in FIGS. 7 to 8 have been described by assuming that the Q-function is deep Q-learning (DQN) in the form of the neural network, other types of reinforcement learning methods may be applied. In addition, while it has been assumed that the receiver receives two CWs for convenience of description, the state, the reward, and the action may be defined in the same manner even when the number of CWs is greater than two.

Implementation 2) in Case of Symbol-Level SIC

Unlike CW-level SIC in which re-encoding is performed through CRC after performing channel decoding, the receiving UE may perform, in symbol-level SIC, SIC by demodulating a symbol without performing channel decoding. Therefore, symbol-level SIC has an advantage that recursive decoding is not needed, whereas symbol-level SIC has a disadvantage that there may be reliability loss.

Assume that the receiving UE receives two CWs through four layers in a 4×4 MIMO environment. That is, each CW may be received through two layers. For example, CW-to-layer mapping may be performed such that $CW_1$ is mapped to layers 1 and 2, and $CW_2$ is mapped to layers 3 and 4. According to an example or implementation of the present disclosure, the state, the reward, and the action may be defined as shown in [Table 2].

TABLE 2

| | |
|---|---|
| State | Channel quality (e.g., CQI) of CW1, code rate of CW1, number of retransmissions of CW1, average SNR of layers 1 and 2, channel quality (e.g., CQI) of CW2, code rate of CW2, number of retransmissions, and/or average SNR of layers 3 and 4 |
| Reward | 0 for NACK and 1 for ACK, or 0 for NACK and 1/number of retransmissions for ACK |
| Action | Layer demodulation policy #1, layer demodulation policy corresponding to order of factorial 4 including layer 1 -> layer 2 -> layer 3 -> layer 4 |

Figure 9:
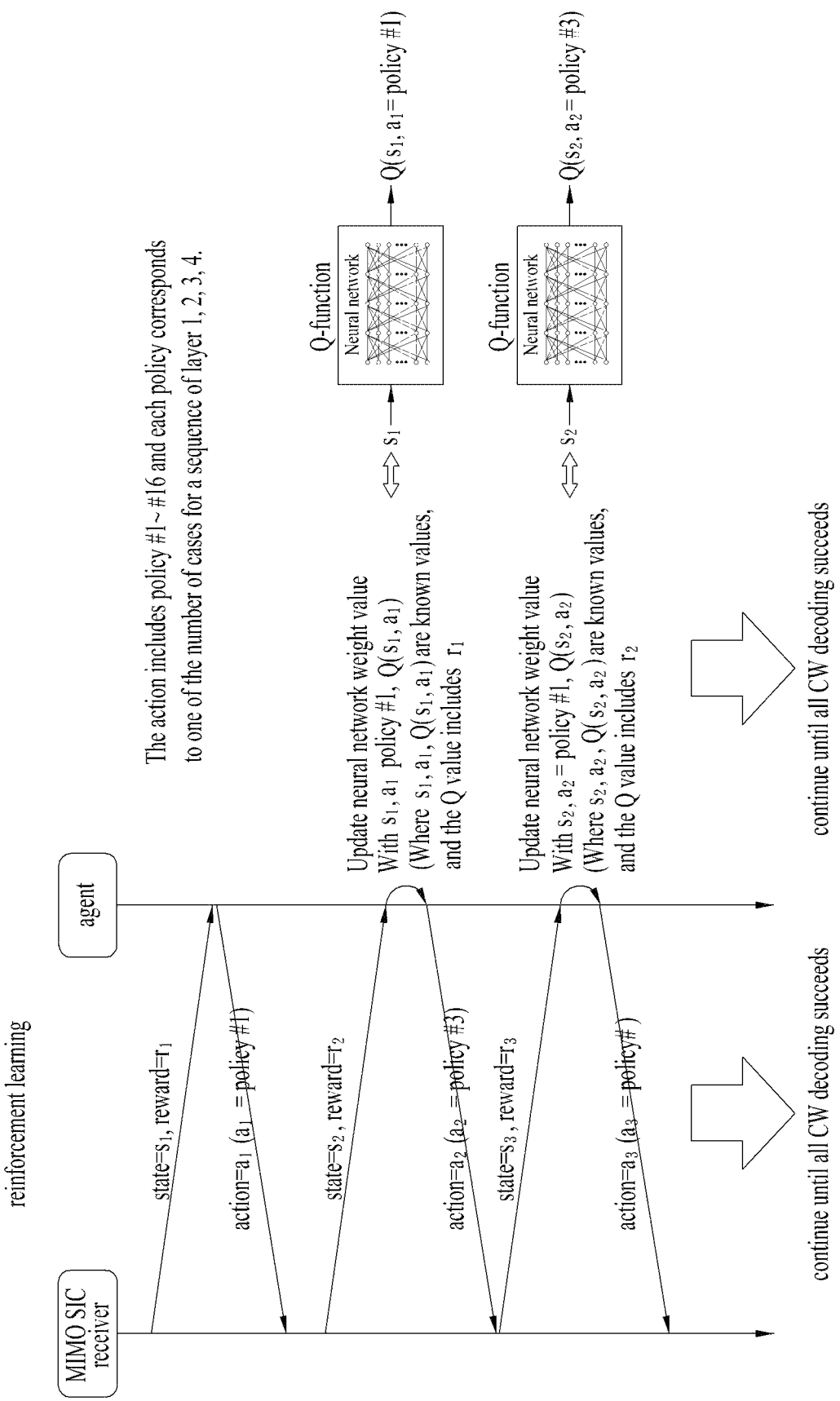
FIGS. 9 and 10 are diagrams illustrating a codeword decoding method applied to a symbol-level SIC according to an example or implementation of the present disclosure.
Figure 10:
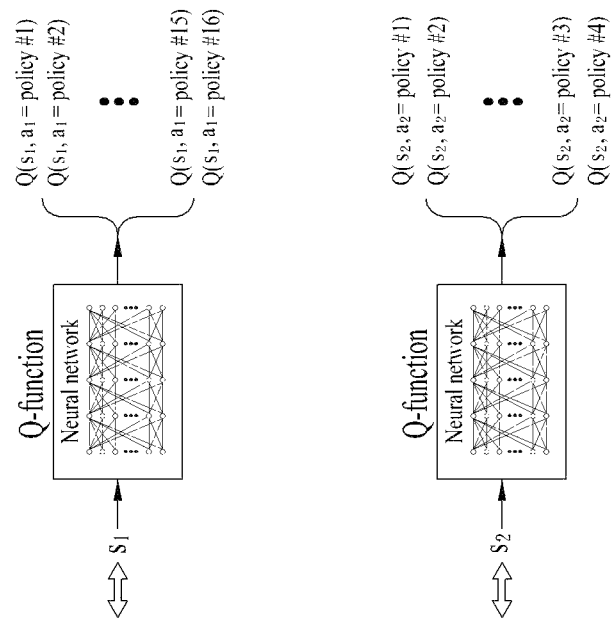

Similar to the case of CW-level SIC illustrated in FIGS. 7 to 8, reinforcement learning of the agent and execution of the pre-trained agent may be described as illustrated in FIGS. 9 and 10 even in the case of symbol-level SIC. That is, in FIGS. 7 to 8, the action determined by the agent and transmitted to the MIMO SIC receiver is the decoding policy for decoding CWs, whereas the action determined by the agent and transmitted to the MIMO SIC receiver in FIGS. 9 and 10 may be a layer demodulation policy corresponding to the order of layers through which CWs are received as shown in [Table 2].

Implementation 3) Consideration of Interference Relationship Between CWs

According to an example or implementation of the present disclosure, an interference relationship between a plurality of CWs received by the MIMO SIC receiver may further be considered in the reinforcement learning process. For example, as illustrated in FIG. 11, the case in which CWs fully overlap and the case in which CWs partially overlap may be separately considered.

Figure 11:
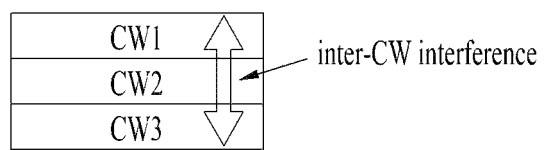
FIG. 11 is a diagram illustrating an interference relationship between a plurality of codewords in a codeword decoding method according to an example or implementation of the present disclosure.
Figure 11:
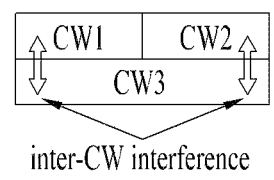

As illustrated in (a) and (b) of FIG. 11, even in a situation in which three CWs are retransmitted, the interference relationship between the CWs may be different. More specifically, in (a) of FIG. 11, CW1, CW2, and CW3 fully overlap, whereas in (b) of FIG. 11, CW1 and CW3, and CW2 and CW3 partially overlap. Reception performance of CW1, CW2, and CW3 in (a) of FIG. 11 may be higher than that in (b) of FIG. 11 in the same time and frequency domains. Therefore, the agent according to an example or implementation of the present disclosure may perform learning to have better performance in determining a decoding policy by adding the interference relationship between CWs to the state and using the interference relationship during Q-table learning.

Implementation 4) HARQ Buffer Update Policy

According to an example or implementation of the present disclosure, when CW decoding fails, a method in which the receiving UE manages a HARQ buffer using an LLR value obtained for decoding from a currently received signal is proposed. The proposed method may be called a buffer update policy determined by the agent of the receiving UE. Specifically, the receiving UE may (i) add an LLR value obtained for decoding from the currently received signal to a previous LLR value stored in the HARQ buffer, (ii) replace the previous LLR value stored in the HARQ buffer with the LLR value obtained for decoding from the currently received signal, or (iii) maintain the previous LLR value stored in the HARQ buffer and drop the LLR value obtained for decoding from the currently received signal. The state, reward, and action according to an example or implementation of the present disclosure may be defined as shown in [Table 3] below.

TABLE 3

| | |
|---|---|
| State | Channel quality (e.g., CQI) of CW1, code rate of CW1, number of retransmissions of CW1, channel quality (e.g., CQI) of CW2, code rate of CW2, and/or number of retransmissions of CW2 |
| Reward | 0 for NACK and 1 for ACK, or 0 for NACK and 1/number of retransmissions for ACK |
| Action | Buffer update policy Adding/replacing/dropping policies of each CW |

Implementation 5) Application of Threshold Value During HARQ Buffer Update

According to [Table 3] described above, upon failing to decode a CW from a currently received signal, the receiving UE may add the LLR value obtained for decoding from the currently received signal to the previous LLR value stored in the HARQ buffer. According to an example or implementation of the present disclosure, only LLR values having a specific threshold value or more may be added to the previous LLR values stored in the HARQ buffer. In this case, the agent may learn a threshold value that optimizes decoding performance and add the threshold value to the buffer update policy. The state, reward, and action according to Implementation 5 may be defined as shown in [Table 4].

TABLE 4

| | |
|---|---|
| State | Channel quality (e.g., CQI) of CW1, code rate of CW1, number of retransmissions of CW1, channel quality (e.g., CQI) of CW2, code rate of CW2, number of retransmissions of CW2 |
| Reward | 0 for NACK and 1 for ACK, or 0 for NACK and 1/number of retransmissions for ACK |
| Action | Buffer update policy Size threshold value of LLR value when adding is performed for each CW |

Figure 12:
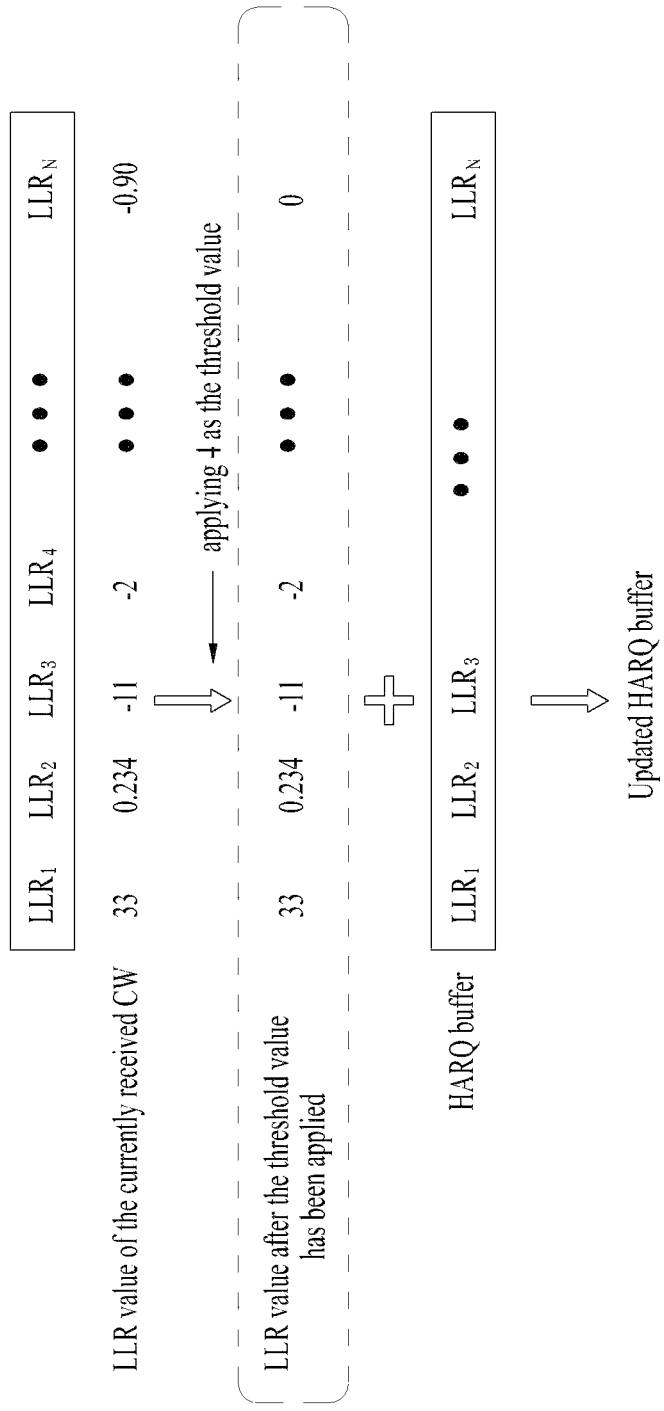
FIG. 12 is a diagram illustrating management of a HARQ buffer included in a codeword decoding method according to an example or implementation of the present disclosure.

Referring to FIG. 12 as an example, LLR values of currently received CWs, i.e., $LLR_1$ (33), $LLR_2$ (0.234), $LLR_3$ (−11), $LLR_4$ (−2) to $LLR_N$ (−0.90) are shown. The LLR values may have positive or negative values. As an absolute value approximates to 0, this may mean that reliability is low. Assuming that the threshold value is set to 4, it may be appreciated that the LLR values after applying the threshold value are $LLR_1$ (33), $LLR_2$ (0), $LLR_3$ (−11), $LLR_4$ (0) to $LLR_N$ (0). Accordingly, the LLR values after the threshold value is applied may be added to previous LLR values stored in the HARQ buffer. The examples or implementations of the present disclosure described above may be performed independently or in combination.

The CW decoding method of the UE according to an example or implementation of the present disclosure includes receiving a plurality of CWs, and decoding the CWs based on SIC. The SIC may be performed based on a decoding policy for decoding the CWs, and the decoding policy may be determined by a neural network trained based on a state and a reward related to the CWs.

The state may include the channel quality of each of a first CW and a second CW, and the reward may include decoding success or failure of each of the first CW and the second CW.

The decoding policy may include i) the order of decoding the CWs and ii) combination and non-combination of each CW with an LLR value calculated in previous transmission of each CW, stored in a HARQ buffer, and the neural network may be trained based on decoding results of the CWs based on the decoding policy.

The state may further include an interference relationship in the time domain and the frequency domain of the CWs, and the neural network may be trained based further on the interference relationship.

Upon failing to decode the CWs based on the decoding policy, the CW decoding method of the UE may further include managing a HARQ buffer using LLR values calculated for the respective CWs.

The managing the HARQ buffer may include i) adding the LLR values calculated for the respective CWs to previous LLR values stored in the HARQ buffer, (ii) replacing the previous LLR values stored in the HARQ buffer with the LLR values calculated for the respective CWs, or (iii) dropping the LLR values calculated for the respective CWs.

The managing the HARQ buffer may include adding only LLR values having a threshold value or more among the LLR values calculated for the respective CWs to the previous LLR values stored in the HARQ buffer.

Figure 13:
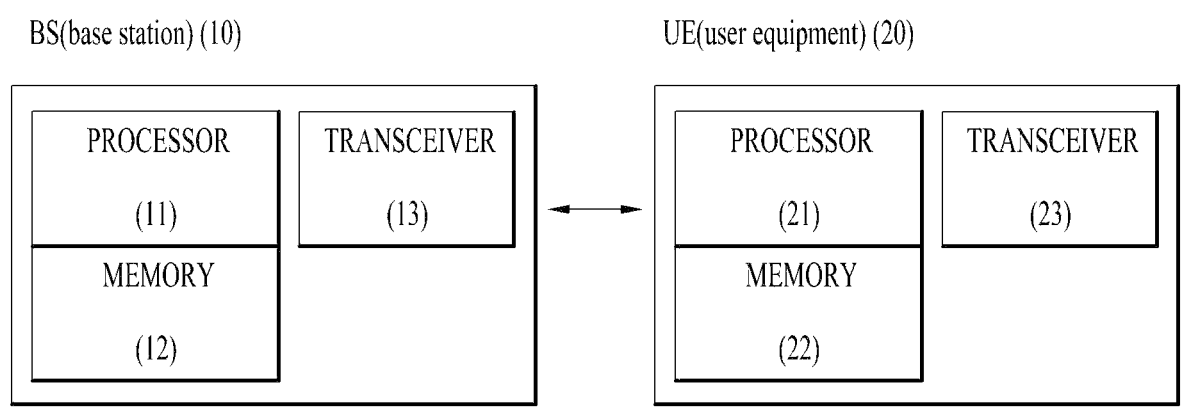
FIG. 13 is a diagram illustrating a system for an example or implementation of the present disclosure.

FIG. 13 is a diagram illustrating a system for an example or implementation of the present disclosure.

Referring to FIG. 13, a wireless communication system includes a BS 10 and at least one UE 20. On downlink, a transmitter may be a part of the BS 10 and a receiver may be a part of the UE. On uplink, the BS 10 may include a processor 11, a memory 12, and a transceiver 13. The processor 11 may be configured to implement the proposed procedures and/or methods described in this application. The memory 12 is coupled to the processor 11 to store various information for operating the processor 11. The transceiver 13 is coupled to the processor 11 to transmit and/or receive radio signals. The UE 20 may include a processor 21, a memory 22, and a transceiver 23. The processor 21 may be configured to implement the proposed procedures and/or methods described in this application. The memory 22 is coupled to the processor 21 to store various information for operating the processor 21. The transceiver 23 is coupled to the processor 21 to transmit and/or receive radio signals. The BS 10 and/or the UE 20 may have a single antenna or multiple antennas. When at least one of the BS 10 and the UE 20 has multiple antennas, the wireless communication system may be referred to as a MIMO system.

In the present specification, the processor 21 of the UE and the processor 11 of the BS perform operations of processing signals and data, except that the UE 20 and the BS 10 receive or transmit signals and store signals. However, for convenience of description, the processors 11 and 21 will not particularly be mentioned below. Although the processors 11 and 21 are not particularly mentioned, the processors 11 and 21 may be regarded as performing operations such as data processing rather than a function of receiving or transmitting signals.

The present disclosure proposes various new frame structures for a fifth generation (5G) communication system. In the next-generation 5G system, scenarios may be classified into enhanced mobile broadband (eMBB), ultra-reliable machine-type communications (uMTC), and massive machine-type communications (mMTC). Here, eMBB is a next-generation mobile communication scenario characterized by high spectral efficiency, high user experienced data rate, and high peak data rate, uMTC is a next-generation mobile communication scenario characterized by ultra-high reliability, ultra-low latency, and ultra-high availability (e.g., vehicle-to-everything (V2X), emergency services, and remote control), and mMTC is a next-generation mobile communication scenario characterized by low cost, low energy, short packet, and massive connectivity (e.g., Internet of things (IoT)).

The UE according to an example or implementation of the present disclosure may include a transceiver and a processor. The transceiver may receive a radio signal including a PDCCH and a PDSCH and transmit a radio signal including a PUCCH and a PUSCH. The transceiver may include a radio frequency (RF) unit.

The UE for decoding a CW according to an example or implementation of the present disclosure may include a transceiver for receiving a plurality of CWs and a processor for decoding the CWs based on SIC. The processor may perform the SIC based on a decoding policy for decoding the CWs and determine the decoding policy through a neural network which is trained based on a state and a reward related to the CWs.

The state may include channel quality of each of a first CW and a second CW, and the reward may include decoding success or failure of each of the first CW and the second CW.

The decoding policy may include i) the order of decoding the CWs and ii) combination or non-combination of each CW with an LLR value calculated in previous transmission of each CW, stored in a HARQ buffer. The processor may train the neural network based on decoding results of the CWs based on the decoding policy.

The state may further include an interference relationship in the time domain and the frequency domain of the CWs, and the processor may train the neural network based further on the interference relationship.

Upon failing to decode the CWs based on the decoding policy, the processor may manage a HARQ buffer using LLR values calculated for the respective CWs.

The processor may i) add the LLR values calculated for the respective CWs to previous LLR values stored in the HARQ buffer, (ii) replace the previous LLR values stored in the HARQ buffer with the LLR values calculated for the respective CWs, or (iii) drop the LLR values calculated for the respective CWs.

The processor may add only LLR values having a threshold value or more among the LLR values calculated for the respective CWs to the previous LLR values stored in the HARQ buffer.

The above-described embodiments of the present disclosure may be implemented through various means, for example, hardware, firmware, software, or a combination thereof.

In a hardware configuration, the methods according to the embodiments of the present disclosure may be achieved by at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the methods according to the embodiments of the present disclosure may be implemented in the form of a module, a procedure, a function, etc. for performing the above-described functions or operations. Software code may be stored in a memory unit and executed by a processor. The memory unit may be located inside or outside the processor and exchange data with the processor via various known means.

The detailed descriptions of the preferred embodiments of the present disclosure are provided to allow those skilled in the art to implement and embody the present disclosure. While the present disclosure has been described and illustrated herein with reference to the preferred embodiments thereof, it will be apparent to those skilled in the art that various modifications and variations may be made therein without departing from the spirit and scope of the disclosure. Therefore, the present disclosure is not limited to the embodiments disclosed herein but intends to give the broadest scope consistent with the new principles and features disclosed herein.

The present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present disclosure or included as a new claim by a subsequent amendment after the application is filed.

INDUSTRIAL APPLICABILITY

While the above-described method of decoding CWs in a wireless communication system and the UE therefor have been described focusing on an example applied to the 3GPP LTE system, the method and the UE are applicable to various wireless communication systems in addition to the 3GPP LTE system.

The invention claimed is:

1. A method of decoding a codeword by a user equipment (UE) in a wireless communication system, the method comprising:
receiving a first codeword and a second codeword; and
decoding the first codeword and the second codeword, respectively, based on successive interference cancellation (SIC),
determining a first Hybrid Automatic Repeat Request-Acknowledgement (HARQ-ACK) information in response to the first codeword and a second HARQ-ACK information in response to the second codeword,
transmitting information related to the first HARQ-ACK information and the second HARQ-ACK information,
wherein the SIC is performed based on a decoding policy determined by a neural network trained based on a state and a reward related to the first codeword and the second codeword, and
wherein the state includes information related to an overlapping ratio of time and frequency resources of the first codeword and time and frequency resources of the second codeword.

2. The method of claim 1, wherein the state includes channel quality of each of the first codeword and the second codeword, and the reward includes whether decoding of each of the first codeword and the second codeword is a success.

3. The method of claim 1,
wherein the decoding policy includes i) an order of decoding the first codeword and the second codeword and ii) whether each of the first codeword and the second codeword is combined with a log likelihood ratio (LLR) value calculated in previous transmission of each of the first codeword and the second codeword, stored in a hybrid automatic repeat and request (HARQ) buffer, and
wherein the neural network is trained based on decoding results of the first codeword and the second codeword based on the decoding policy.

4. The method of claim 1, further comprising managing a hybrid automatic repeat and request (HARQ) buffer using log likelihood ratio (LLR) values calculated for each of the first codeword and the second codeword upon failing to decode the first codeword and the second codeword based on the decoding policy.

5. The method of claim 4, wherein the managing the HARQ buffer includes
i) adding the LLR values calculated for the each of the first codeword and the second codeword to previous LLR values stored in the HARQ buffer, (ii) replacing the previous LLR values stored in the HARQ buffer with the LLR values calculated for each of the first codeword and the second codeword, or (iii) dropping the LLR values calculated for each of the first codeword and the second codeword.

6. The method of claim 5, wherein the managing the HARQ buffer includes adding only LLR values having a threshold value or more among the LLR values calculated for each of the first codeword and the second codeword to the previous LLR values stored in the HARQ buffer.

7. A user equipment (UE) for decoding a codeword in a wireless communication system, the UE comprising:
a transceiver; and
a processor configured to control the transceiver;
wherein the processor is further configured to:
control the transceiver to receive a first codeword and a second codeword; and
decode the first codeword and the second codeword respectively, based on successive interference cancellation (SIC),
determine a first Hybrid Automatic Repeat Request-Acknowledgment (HARQ-ACK) information in response to the first codeword and a second HARQ-ACK information in response to the second codeword, transmit information related to the first HARQ-ACK information and the second HARQ-ACK information,
wherein the SIC is performed based on a decoding policy determined by a neural network trained based on a state and a reward related to the first codeword and the second codeword, and
wherein the state includes information related to an overlapping ratio of time and frequency resources of the first codeword and time and frequency resources of the second codeword.

8. The UE of claim 7, wherein the state includes channel quality of each of the first codeword and the second codeword, and the reward includes whether decoding of each of the first codeword and the second codeword is a success.

9. The UE of claim 7,
wherein the decoding policy includes i) an order of decoding the first codeword and the second codeword and ii) whether each of the first codeword and the second codeword is combined with a log likelihood ratio (LLR) value calculated in previous transmission of each of the first codeword and the second codeword, stored in a hybrid automatic repeat and request (HARQ) buffer, and
wherein the neural network is trained based on decoding results of the first codeword and the second codeword based on the decoding policy.

10. The UE of claim 7, wherein, upon failing to decode the first codeword and the second codeword based on the decoding policy, the processor manages a hybrid automatic repeat and request (HARQ) buffer using log likelihood ratio (LLR) values calculated for each of the first codeword and the second codeword.

11. The UE of claim 10, wherein the processor i) adds the LLR values calculated for each of the first codeword and the second codeword to previous LLR values stored in the HARQ buffer, (ii) replaces the previous LLR values stored in the HARQ buffer with the LLR values calculated for each of the first codeword and the second codeword, or (iii) drops the LLR values calculated for each of the first codeword and the second codeword.

12. The UE of claim 11, wherein the processor adds only LLR values having a threshold value or more among the LLR values calculated for each of the first codeword and the second codeword to the previous LLR values stored in the HARQ buffer.

* * * * *